United States Patent [19]

Sugai et al.

[11] Patent Number: 4,541,589
[45] Date of Patent: Sep. 17, 1985

[54] MAGNETIC RECORDING AND REPRODUCING APPARATUS

[75] Inventors: Manabu Sugai; Yasuyoshi Kagohashi, both of Yokohama; Hiroshi Aoki, Nagano, all of Japan

[73] Assignee: Matsushita Electric Industrial Co., Ltd., Kadoma, Japan

[21] Appl. No.: 601,225

[22] Filed: Apr. 17, 1984

[30] Foreign Application Priority Data

Apr. 19, 1983 [JP] Japan .................................. 58-69421

[51] Int. Cl.⁴ .......................... G03B 1/04; G11B 15/32
[52] U.S. Cl. ......................................... 242/200; 360/73
[58] Field of Search ............... 242/200, 204, 206, 210, 242/67.4; 74/797, 798; 360/71, 73, 74.1, 96.2, 96.3

[56] References Cited

U.S. PATENT DOCUMENTS 3,758,049 9/1973 Staar ..................................... 242/201
3,900,174 8/1975 Morimoto et al. ................... 242/209
4,173,320 11/1979 Schatteman .......................... 242/206

Primary Examiner—Leonard D. Christian
Attorney, Agent, or Firm—Spencer & Frank

[57] ABSTRACT

The present invention relates to fast forward (FF) and fast rewind (REW) mechanism of a magnetic recording and reproducing apparatus. This mechanism has: first and second arms to which first and second gears for tranferring the rotational forces of first and second flywheels to first and second reel axes are rotatably supported; a driving plate whose rotating direction differs in accordance with the running direction of a magnetic tape; and an FF lever and an REW lever for rotating this driving plate, wherein the driving plate is rotated by operating the FF or REW lever, the first or second arm is rotated by this driving plate, the rotation of first or second flywheel can be transferred to the first or second reel axis, and the FF operation is performed when operating the FF lever and the REW operation is executed when operating the REW lever irrespective of the running direction of the magnetic tape.

15 Claims, 19 Drawing Figures

MAGNETIC RECORDING AND REPRODUCING APPARATUS

BACKGROUND OF THE INVENTION

The present invention relates to a magnetic recording and reproducing apparatus and, more particularly, to a magnetic recording and reproducing apparatus of the type for motor vehicles or the like, which is used by being mounted in, for example, an automobile.

A magnetic recording and reproducing apparatus of the present invention can be applied to any apparatus only for use in reproduction or any apparatus which can record and reproduce.

FIG. 1 shows a conventional magnetic recording and reproducing apparatus for use in an automobile. In FIG. 1, reference numeral 1 denotes a main body, in which a cassette inserting inlet 3, into which a cassette half 2 shown in FIG. 2 is inserted, is formed. When the cassette half 2 is inserted into the cassette inserting inlet 3, a motor in the main body 1 begins rotating, so that a magnetic tape 4 in the cassette half 2 is run in the direction of A or B and the apparatus is operated in the reproducing mode. In addition, the direction A indicates the running direction in the case of reproducing the side A of the cassette half 2, while the direction B represents the running direction in the case of reproducing the side B of the cassette half 2. Reference numeral 5 denotes an operating button for ejecting the cassette half 2 whose reproducing operation has been stopped to the outside from the cassette inserting inlet 3, and reference numerals 6 and 7 indicate operating buttons for performing the fast forwarding (FF) or fast rewinding (REW) operation from the reproducing mode. For example, when the operating button 6 is now depressed in the state in that the side A is being reproduced, the magnetic tape 4 is fast forwarded (FF) in the direction indicated by an arrow A. On the other hand, when the operating button 7 is depressed in the reproducing mode of the side A, the magnetic tape 4 is fast rewound (REW) in the direction indicated by an arrow B. On the contrary, when the operating button 6 is depressed in the reproducing mode of the side B, the magnetic tape 4 is fast rewound (REW) in the direction of A and when the operating button 7 is depressed, it is fast forwarded (FF) in the direction of B.

In this way, in such a conventional type of magnetic recording and reproducing apparatus, the operating button 6 serves as the operating button for either fast forward or fast rewind in accordance with the reproducing mode of the side A or B. Similarly, the operating button 7 also serves as the operating button for either fast forward or fast rewind according to the reproducing mode of the side A or B. Therefore, there is a drawback such that unless it is recognized that which side of A or B is being reproduced, it is difficult to determine which operating button 6 or 7 should be operated to perform the fast forwarding or fast rewinding operation. In addition, in FIG. 1, numeral 8 denotes a knob for adjusting tone and 9 is a knob for adjusting sound volume.

SUMMARY OF THE INVENTION

A first object of the present invention is to provide a magnetic recording and reproducing apparatus having novel FF and REW means for fast forwarding (FF) and fast rewinding (REW) a magnetic tape.

A second object of the present invention is to provide a magnetic recording and reproducing apparatus of the automatically reversible type, namely, such an apparatus having FF and REW means which is useful for a magnetic recording and reproducing apparatus which automatically shifts to the reproducing mode of the side B (or side A) when the end of a magnetic tape is detected in the reproducing mode of the side A (or side B).

A third object of the present invention is to provide a magnetic recording and reproducing apparatus, in which even when it is in the reproducing mode of the side A or B, that is, irrespective of the running direction of a magnetic tape, the FF operation is performed by operating means only for use of fast forward (FF) and the REW operation is carried out by operating means only for use of fast rewind (REW).

A fourth object of the present invention is to provide a magnetic recording and reproducing apparatus in which irrespective of the running direction of a magnetic tape, the FF operation is executed by operating an operating button only for use of FF and the REW operation is performed by operating an operating button only for use of REW.

A fifth object of the present invention is to provide novel FF and REW means by a simple mechanism.

DETAILED DESCRIPTION OF THE PREFERRED EMBODIMENTS

One embodiment of the present invention will be described hereinbelow.

Figure 1:
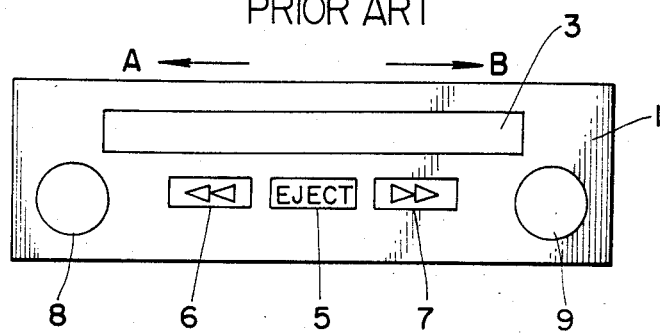
FIG. 1 is a front view showing a conventional magnetic recording and reproducing apparatus.
Figure 2:
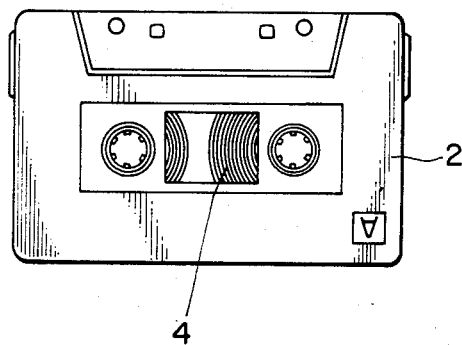
FIG. 2 is a top view showing a cassette half.
Figure 3:
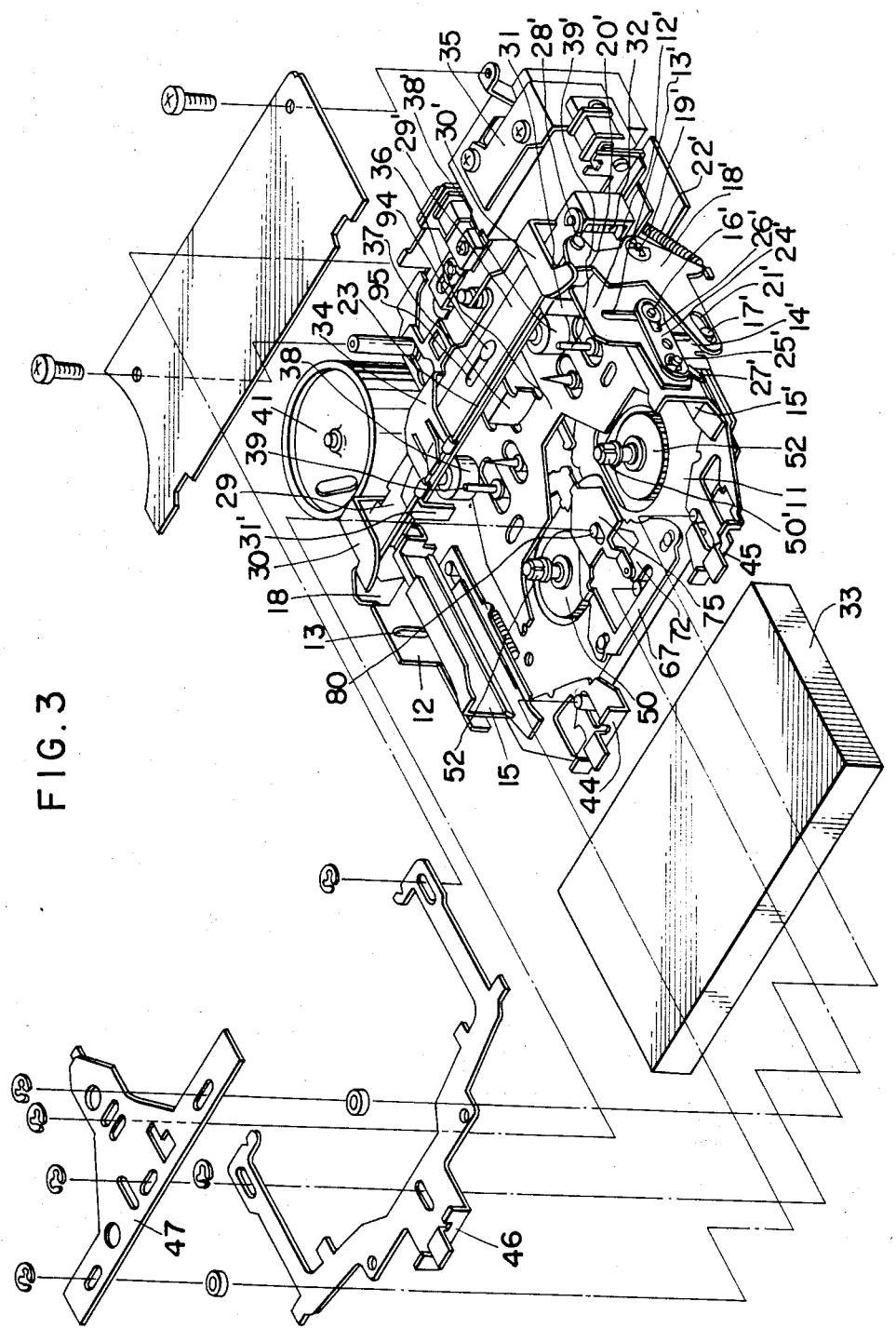
FIG. 3 is a top perspective view illustrating an exploded assembly of a part of a magnetic recording and reproducing apparatus in accordance with one embodiment of the present invention.
Figure 4:
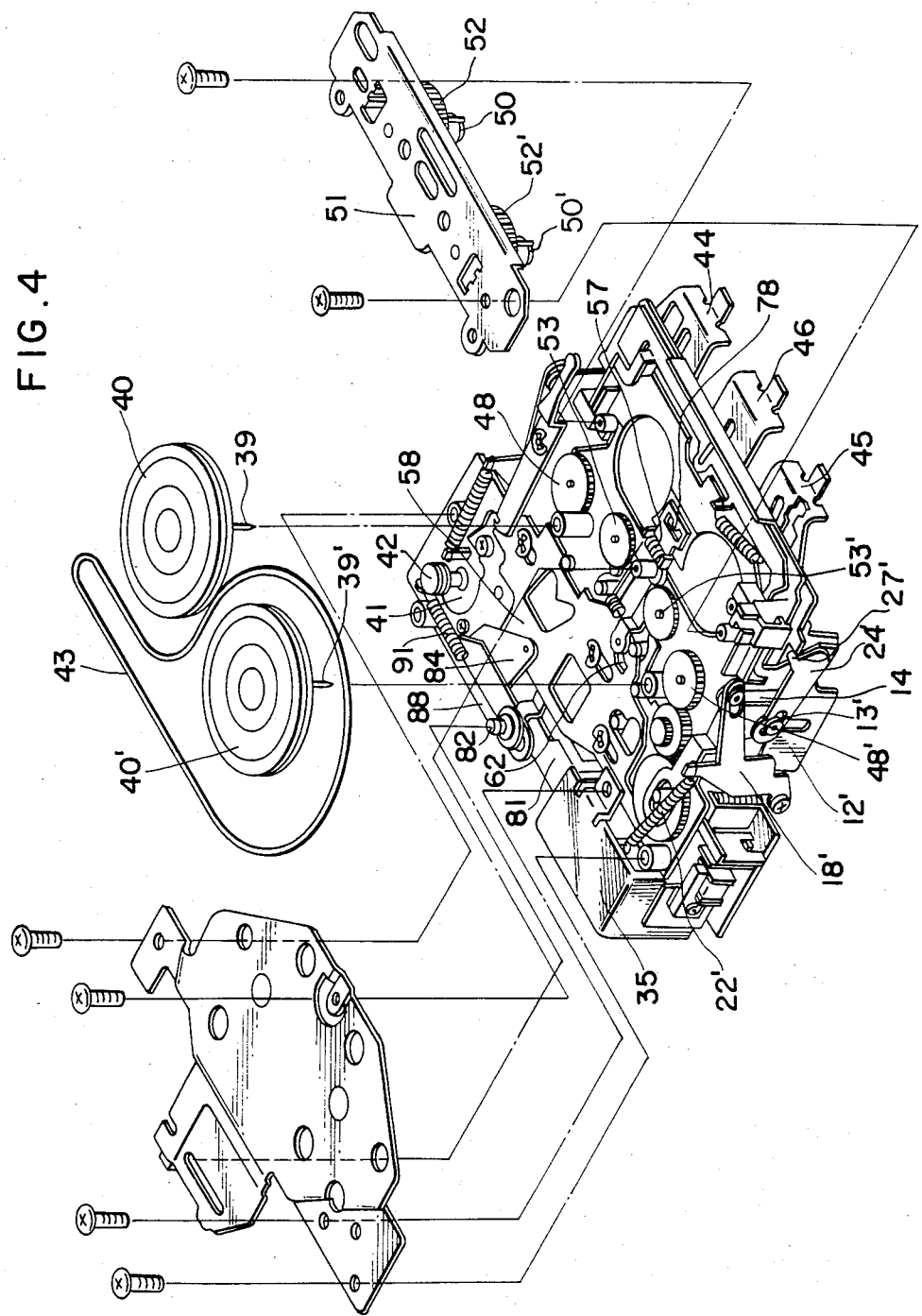
FIG. 4 illustrates a bottom perspective view of the same.

In FIGS. 3 and 4, reference numeral 11 denotes a chassis and side plates 12 and 12' which are bent upwardly are integrally formed at both sides of this chassis 11. Numerals 13, 14, and 13', 14' represent guide holes formed in the side plates 12 and 12'; and numerals 15 and 15' are cassette supporting members each having a C-shaped cross section for supporting a cassette half 33 inserted. Pins 16, 17, and 16', 17' formed in these cassette supporting members 15 and 15' are inserted into the guide holes 13, 14, and 13', 14', so that the cassette supporting members 15 and 15' are guided by the guide holes 13, 14, and 13', 14', and are moved. Numerals 18 and 18' are levers each having an almost L-shaped form, which levers are rotatably supported to the side plates 12 and 12' by means of pins 19 and 19'. Notched engaging portions 20 and 20' are formed in the upper portions of these levers 18 and 18'. Long holes 21 and 21' are formed in the free ends of the levers 18 and 18'. The pins 17 and 17' of the cassette supporting members 15 and 15' which are inserted into the guide holes 14 and 14' in the side plates 12 and 12' are inserted into these long holes 21 and 21'. Numerals 22 and 22' are springs for forcing the L-shaped levers 18 and 18' in one direction. Numeral 23 is a coupling rod whose end portions are respectively fixed to the L-shaped levers 18 and 18'. Numerals 24 and 24' are levers which are rotatably supported to the side plates 12 and 12' by pins 25 and 25'. Long holes 26 and 26' are formed in the edges of these levers 24 and 24'. The pins 16 and 16' of the cassette supporting members 15 and 15' which penetrated the guide holes 13 and 13' of the side plates 12 and 12' are inserted into these long holes 26 and 26'. Numerals 27 and 27' are driving claws which are integrally formed with the levers 24 and 24'.

Numerals 28 and 28' are axes fixed to the chassis 11, and 29 and 29' are cassette detecting arms. A pin 94 is implanted at the center of the cassette detecting arm 29, while a long hole 95 through which this pin 94 is inserted is implanted at the center of the other cassette detecting arm 29'. Each one end of these cassette detecting arms 29 and 29' is bent like a C-shape, and these bent portions are rotatably supported to the axes 28 and 28'. Numerals 30 and 30' are engaging members which are integrally formed with the cassette detecting arms 29 and 29'. These engaging members 30 and 30' extend upwardly from the cassette detecting arms 29 and 29', and are folded to the front halfway and their top surfaces are L-shaped. Numerals 31 and 31' are cassette detecting members consisting of the downwardly bent free ends of the cassette detecting arms 29 and 29'. Numeral 32 is a spring supported by the axis 28'. One end of the spring 32 engages the cassette detecting arm 29' and the other end engages the chasis 11. The free ends of the cassette detecting arms 29 and 29' are forced so as to be moved ahead by means of this spring 32.

Figure 5:
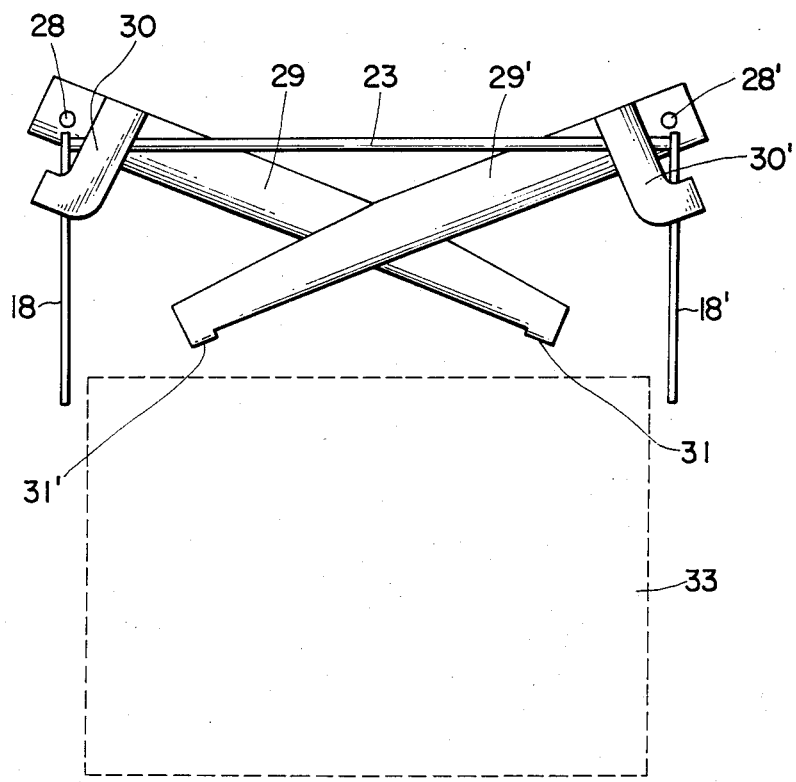
FIGS. 5 and 6 are top views showing the operations of cassette detecting arms of the apparatus shown in FIGS. 3 and 4.
Figure 6:
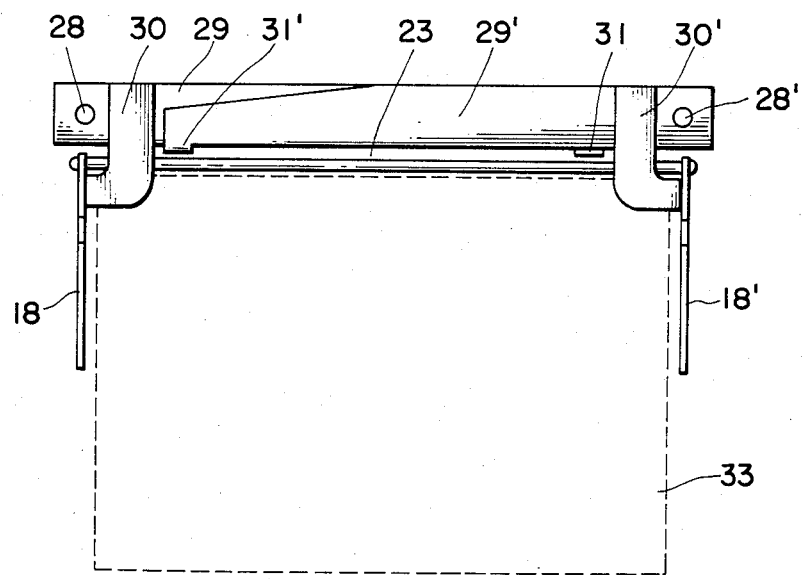

FIGS. 5 and 6 show the operations of the cassette detecting arms 29 and 29' and the like in the case where a cassette half was inserted into the cassette supporting members 15 and 15'.

As shown in FIG. 5, at the former stage in that the cassette half 33 is not inserted, the free ends of the cassette detecting arms 29 and 29' protrude ahead due to elastic force of the spring 32, so that they look like an X form.

When the cassette half 33 is gradually inserted into the cassette members 15 and 15' against the elastic force of the spring 32, the front surface of the cassette half 33 abuts on the cassette detecting members 31 and 31' of the cassette detecting arms 29 and 29', thereby allowing the cassette detecting arms 29 and 29' to be rotated around the axes 28 and 28'. When the cassette detecting arms 29 and 29' are being rotated, the engaging members 30 and 30' formed integrally with these cassette detecting arms 29 and 29' are also rotated together with the cassette detecting arms 29 and 29' while they are in engagement with the notched engaging portions 20 and 20' of the levers 18 and 18'.

When the cassette half 33 is further depressed backward and the cassette detecting arms 29 and 29' are further rotated in association with it, the engaging members 30 and 30' disengage the notched engaging portions 20 and 20' of the levers 18 and 18'. Thus, the levers 18 and 18' are rotated due to tensile forces of the springs 22 and 22', so that the pins 17 and 17' in engagement with these levers 18 and 18' are forced downward. Due to this, the cassette supporting members 15 and 15' are moved downward with the cassette half 33 supported. On the other hand, FIG. 6 shows the state in that the cassette supporting members 15 and 15' moved downward. In this state, the engaging members 30 and 30' of the cassette detecting arms 29 and 29' come into contact with the side surfaces of the levers 18 and 18', so that the rotation of the cassette detecting arms 29 and 29' due to spring force of the spring 32 is obstructed.

In FIG. 3, numeral 34 is a switch driving member whose one end is in engagement with the coupling rod 23. When the cassette half 33 is inserted into the cassette supporting members 15 and 15' and these cassette supporting members 15 and 15' are moved downward due to rotation of the levers 18 and 18', the switch driving member 34 is moved forward by the coupling rod 23 which is moved ahead in association with the rotation of the levers 18 and 18', thereby closing a switch (not shown). When this switch is closed, a plunger 35 is made operative, allowing a slide plate 36 to be driven ahead. A magnetic head 37 is attached to this slide plate 36. Numerals 38 and 38' are pinch rollers and these pinch rollers 38 and 38' are moved ahead in association with the forward movement of the slide plate 36 and are depressed onto capstan axes 39 and 39'. These capstan axes 39 and 39' are rotatably supported to a bearing fixed to the chassis 11, and flywheels 40 and 40' are fixed to the lower ends of the capstan axes 39 and 39'.

Reference numeral 41 is a motor and a pulley 42 is fixed to a rotary shaft of this motor 41. Numeral 43 is a belt and this belt 43 is put around the pulley 42 and flywheels 40 and 40'. Therefore, when the motor 41 rotates, the flywheels 40 and 40' are rotated and the capstan axes 39 and 39' are also rotated.

Numeral 44 is an FF lever slidably supported to the chassis 11 and this FF lever 44 is pushed forward by a spring. This FF lever 44 is operated when performing the fast forwarding (FF) operation. Numeral 45 is an REW lever slidably supported to the chassis 11 and this REW lever 45 is pushed forward by a spring. This REW lever 45 is operated when performing the fast rewinding (REW) operation. Numeral 46 is an eject lever slidably supported to the chassis 11, and this eject lever 46 is operated when stopping the fast forwarding (FF) or fast rewinding (REW) operation and when ejecting the cassette half 33 outside. Numeral 47 is a lever lock plate slidably supported to the chassis 11 and this lever lock plate 47 is slidable in the direction perpendicular to the sliding directions of the FF lever 44, REW lever 45 and eject lever 46. When the FF lever 44 or REW lever 45 is pushed, the lever lock plate 47 slides, thereby locking the FF lever 44 or REW lever 45 so as to keep the pressed FF lever 44 or REW lever 45 in the depressed state. In addition, when the eject lever 46 is pushed in the locked state, this lock is released. On one hand, when the eject lever 46 is again pushed in the unlocked state of the FF lever 44 or REW lever 45, this eject lever 46 abuts on the driving claws 27 and 27' of the levers 24 and 24', causing these levers 24 and 24' to be rotated. When the levers 24 and 24' are rotated, the pins 16 and 16' of the cassette supporting members 15 and 15' in engagement with these levers 24 and 24' are moved upward, so that the cassette supporting members 15 and 15' are moved upward and the levers 18 and 18' are also rotated. Furthermore, when the eject lever 46 is pressed, the levers 24 and 24' and levers 18 and 18' are further rotated, allowing the engaging members 30 and 30' to be abut on the side surfaces of the levers 18 and 18', so that the cassette detecting arms 29 and 29' whose rotation is obstructed are rotated due to spring force of the spring 32, thereby ejecting the cassette half 33 to the front.

There will be then described a series of operations in which after the cassette half 33 was inserted, the reproducing operation is performed and the cassette half 33 is ejected in the above embodiment.

First of all, the cassette half 33 is inserted into the cassette supporting members 15 and 15'. The cassette detecting arms 29 and 29' whose free ends have been moved forward as shown in FIG. 5 are pushed backward by the cassette half 33 inserted. When the cassette detecting arms 29 and 29' are rotated to predetermined locations, the engaging members 30 and 30' disengage the notched engaging portions 20 and 20' of the levers 18 and 18', so that the levers 18 and 18' are rotated due to spring forces of the springs 22 and 22' and the cassette supporting members 15 and 15' are moved downward. Thus, the cassette half 33 is set into the location where the reproduction is possible (or into the location where the recording is possible). When the levers 18 and 18' are rotated, the coupling rod 23 is also rotated and this allows the switch driving member 34 to be moved ahead, thereby closing a switch (not shown). Due to this, the motor 41 rotates and the plunger 35 is made operative and the slide plate 36 is moved ahead, so that the magnetic head 37 fixed to this slide plate 36 comes into contact with the magnetic tape in the cassette half 33. In addition, the pinch rollers 38 and 38' are also moved ahead in association with the forward movement of the slide plate 36, so that the magnetic tape is sandwiched by these pinch rollers 38 and 38' and capstan axes 39 and 39'. The rotational force of the motor 41 is transferred through the belt 43 to the flywheels 40 and 40', thereby rotating the capstan axes 39 and 39'. Thus, the magnetic tape is run and the reproduction or recording is performed.

When the eject lever 46 is pushed at the end of the reproducing or recording (sound recording) operation, the driving claws 27 and 27' of the levers 24 and 24' are driven by this eject lever 46, thereby causing the levers 24 and 24' to be rotated. When the levers 24 and 24' are rotated, the pins 16 and 16' of the cassette supporting members 15 and 15' which were inserted into the long holes 26 and 26' of these levers 24 and 24' are driven by the levers 24 and 24', thereby raising the cassette supporting members 15 and 15'. Since the pins 17 and 17' of the cassette supporting members 15 and 15' are also raised in association with the elevation of the cassette supporting members 15 and 15', the levers 18 and 18' are rotated by these pins 17 and 17', so that the engaging members 30 and 30' of the cassette detecting arms 29 and 29' engage the notched engaging portions 20 and 20' of the levers 18 and 18'. Therefore, the cassette detecting arms 29 and 29', of which rotation has been obstructed by the levers 18 and 18' are rotated due to spring force of the spring 32, thereby ejecting the cassette half 33 to the front.

Then, there will be described the mechanism for transferring the rotational driving forces of the flywheels 40 and 40' to the reel axis. In FIG. 4, numerals 48 and 48' denote gears which are always in engagement with gears 49 and 49' (refer to FIGS. 7 to 12) of small diameters which are formed on the flywheels 40 and 40'. The central axes of these gears 48 and 48' slightly rotate around the capstan axes 39 and 39' in association with the slide motion of the slide plate 36. Numerals 50 and 50' denote reel axes rotatably supported to a base plate 51 and gears 52 and 52' are mounted to these reel axes 50 and 50'. The base plate 51 is fixedly screwed to the chassis 11. When the slide plate 36 is moved ahead due to driving force of the plunger 35, the gear 48 or 48' is moved and engages the gear 52 or 52' of the reel axis 50 or 50'. Therefore, the rotational driving force of the flywheel 40 or 40' is transferred from the gear 49 or 49' of a small diameter formed on this flywheel 40 or 40' through the gear 48 or 48' to the gear 52 or 52' of the reel axis 50 or 50'. Due to this, the reel axis 50 or 50' is rotated and a reel in the cassette half 33 adapted to come into engagement with this reel axis 50 or 50' is driven and rotated.

In FIG. 4, numerals 53 and 53' denote gears, of which central axes are moved in dependence upon the pushing operation of the FF lever 44 or REW lever 45. When the FF lever 44 or REW lever 45 is pressed, the gear 53 or 53' comes into engagement with a gear 54 or 54' (refer to FIGS. 7 to 12) of a large diameter formed on the flywheel 40 or 40' and with the gear 52 or 52' of the reel axis 50 or 50'. Therefore, the rotational driving force of the flywheel 40 or 40' is transferred from the gear 54 or 54' of a large diameter formed on this flywheel 40 or 40' through the gear 53 or 53' to the gear 52 or 52' of the reel axis 50 or 50'. Thus, the reel axis 50 or 50' is fastly rotated and the fast forwarding operation or fast rewinding operation of the magnetic tape is performed.

Figure 7:
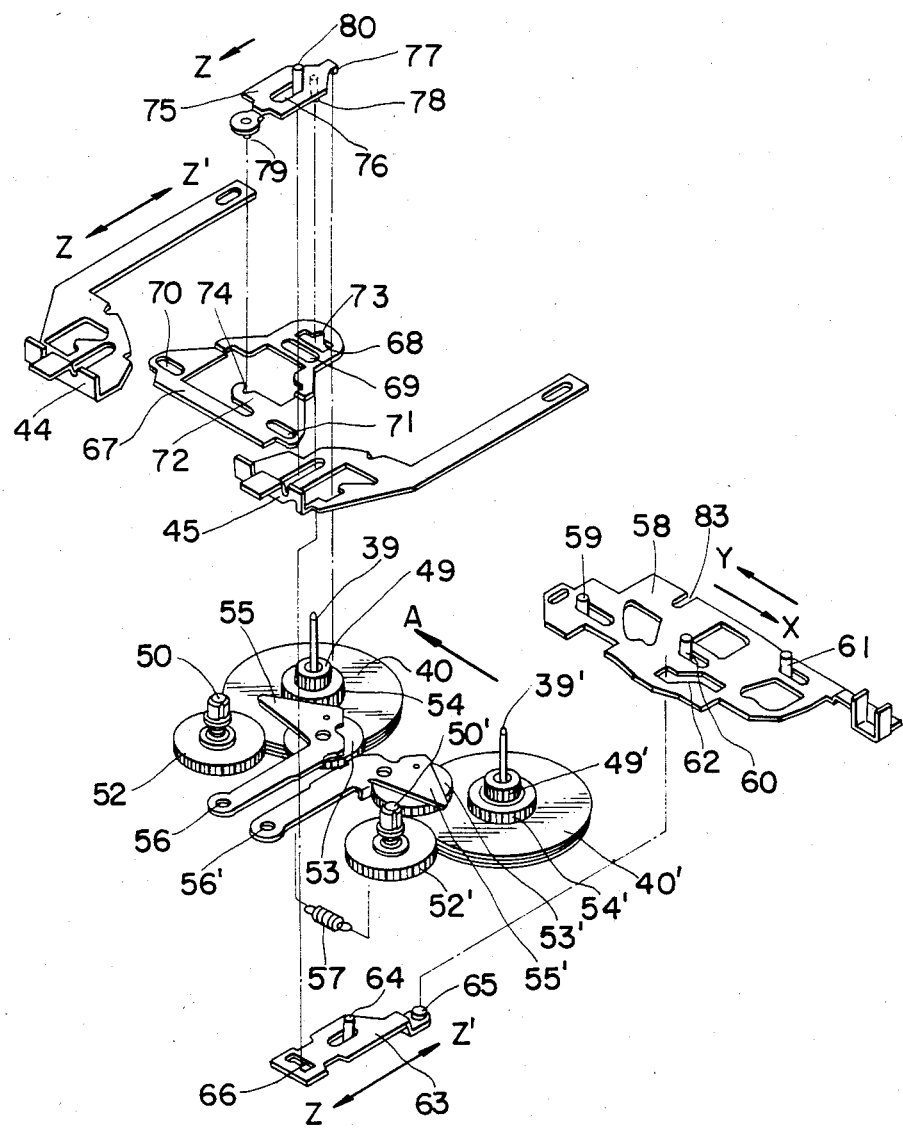
FIGS. 7 to 12 are exploded perspective views illustrating the principal sections to show the operations of the apparatus shown in FIGS. 3 and 4.
Figure 8:
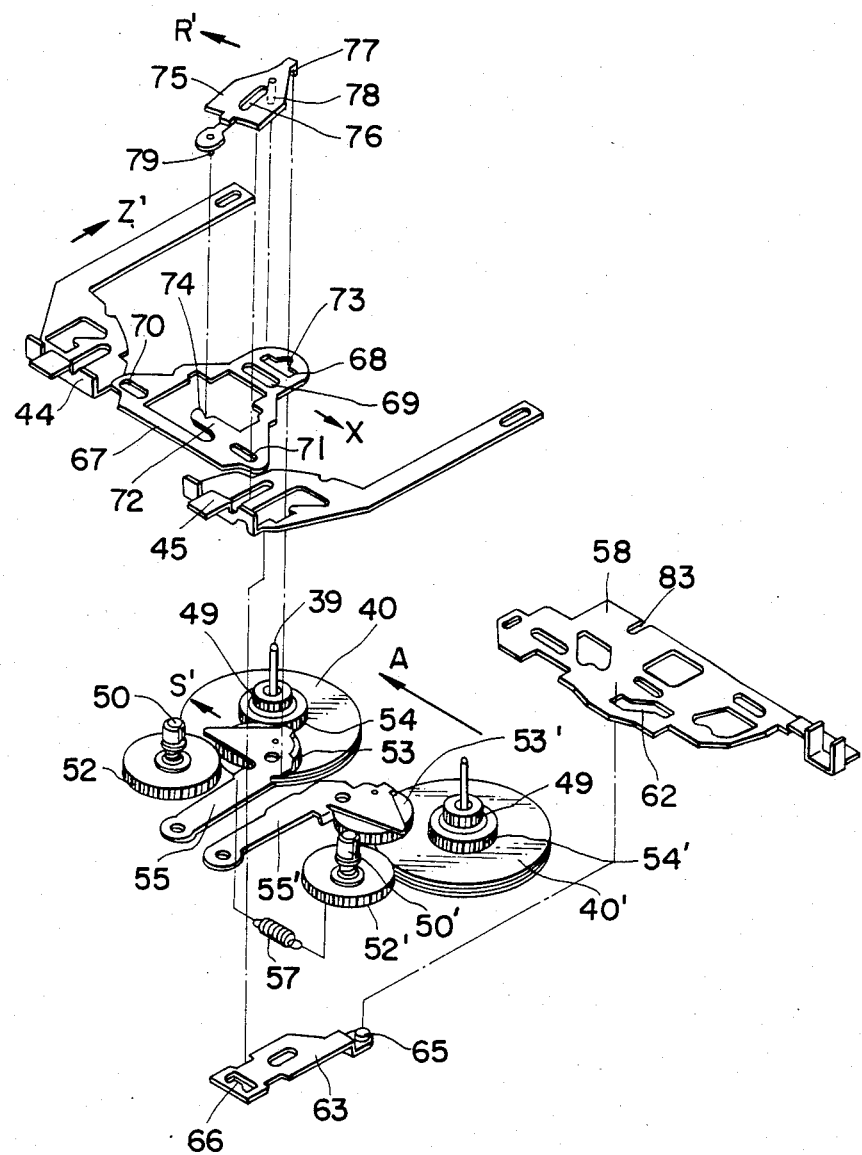
Figure 9:
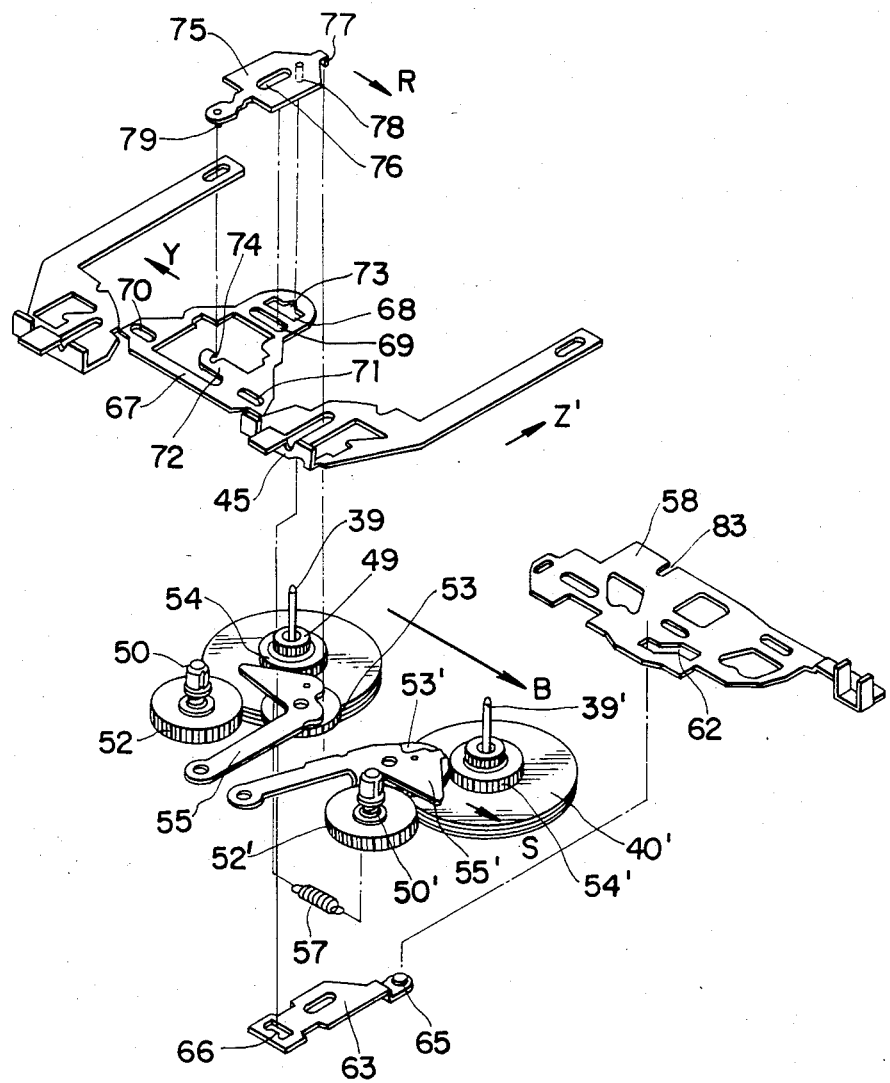
Figure 10:
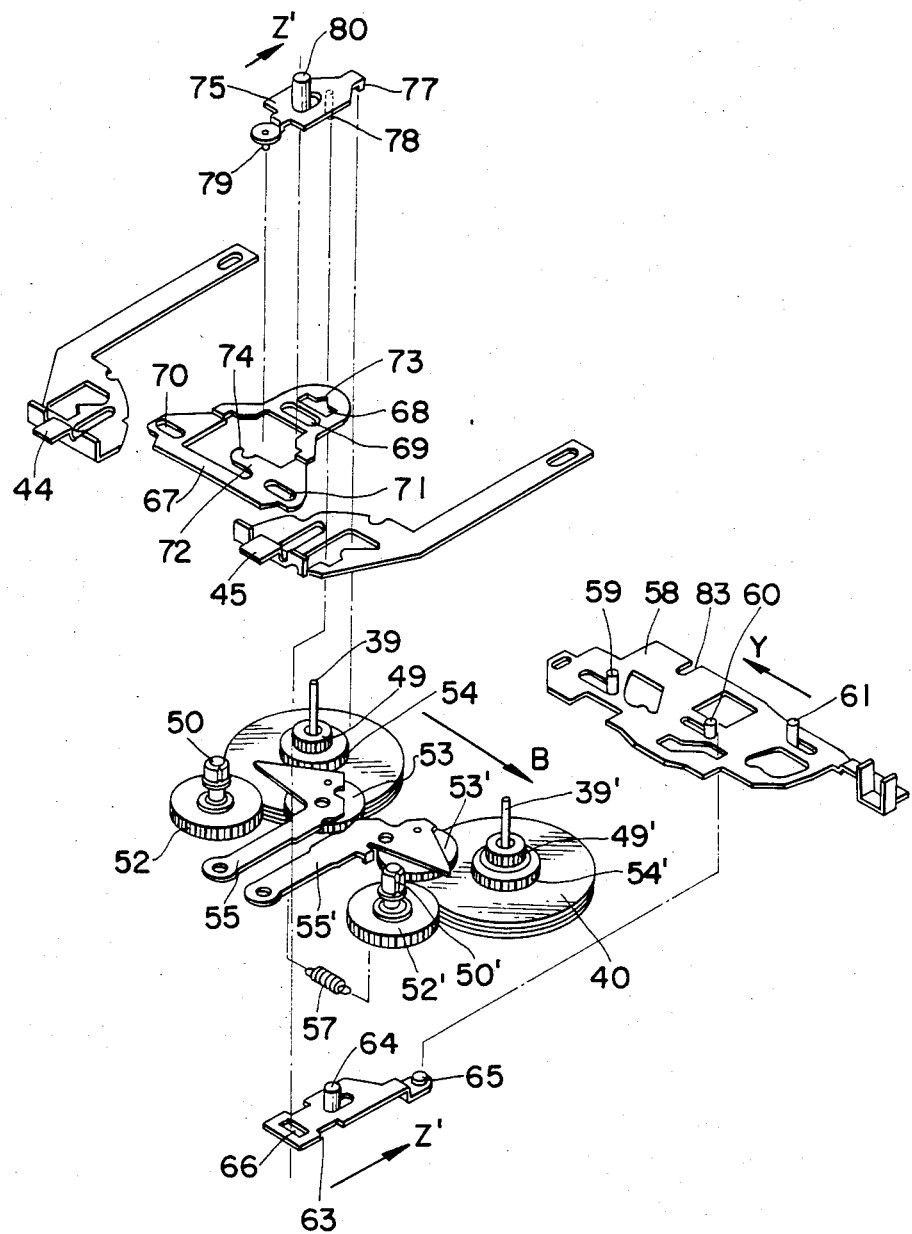
Figure 11:
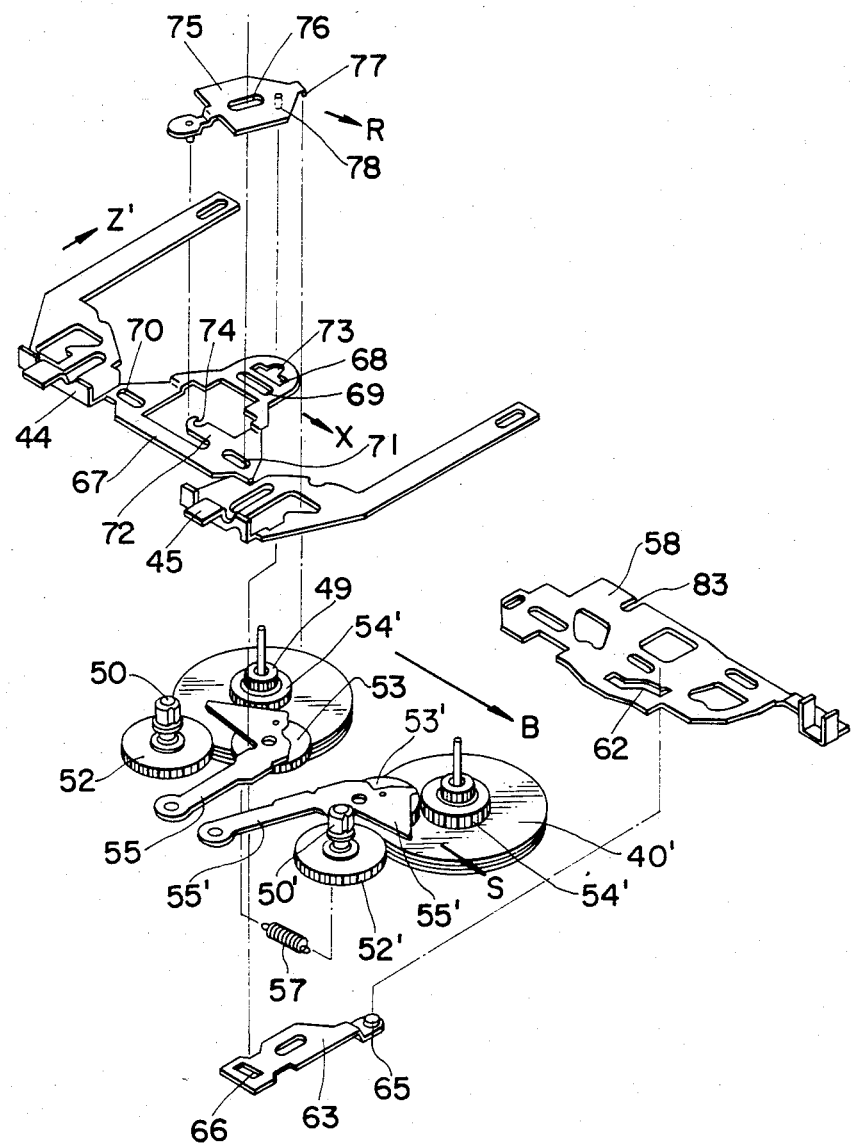
Figure 12:
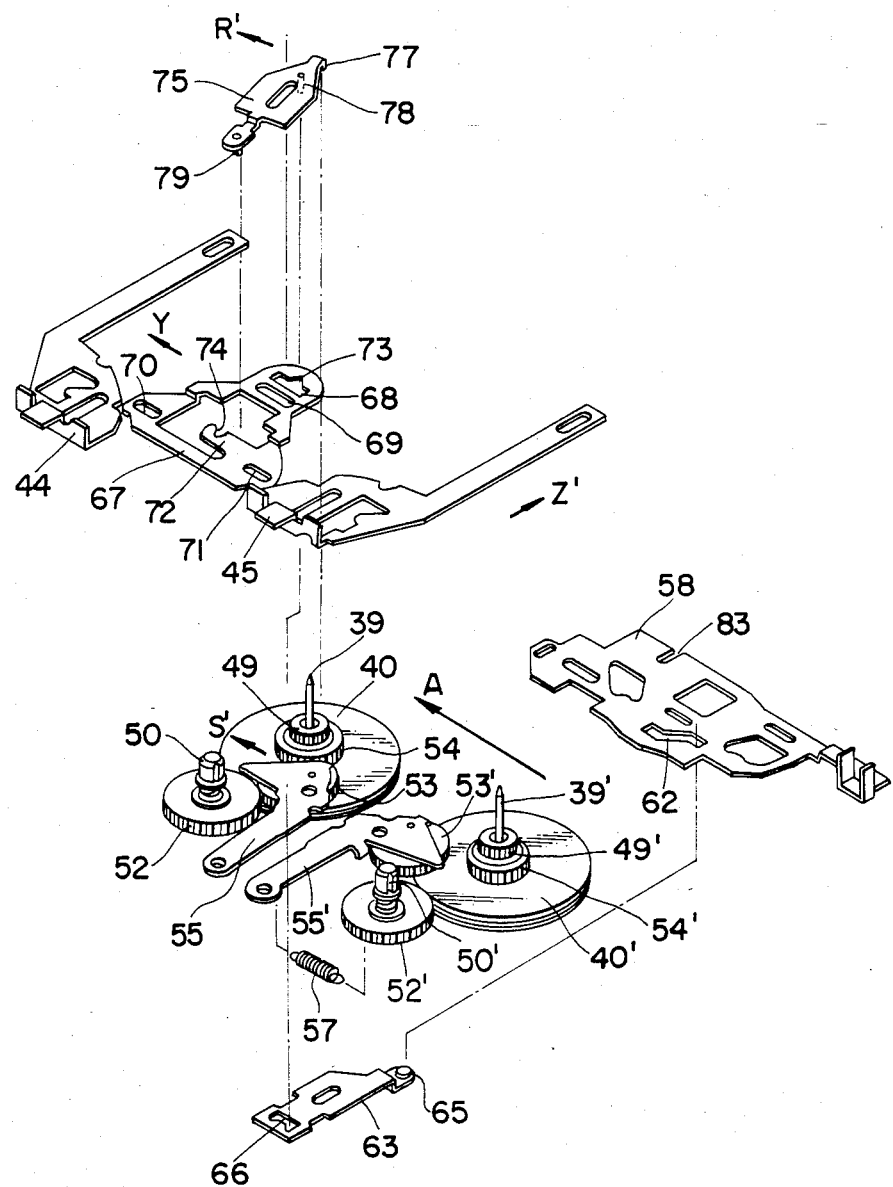

Then, the fast forward and fast rewind mechanism which is a feature of the present embodiment will be described with reference to FIGS. 7 to 12. FIGS. 7 to 9 illustrate the diagrams to describe the operations when the magnetic tape of the side A is run, and FIGS. 10 to 12 illustrate the diagrams to describe the operations when the magnetic tape of the side B is run.

In FIGS. 7-12, numerals 40 and 40' denote the flywheels; 54 and 54' are the gears of large diameters formed on the flywheels 40 and 40'; 49 and 49' are the gears of small diameters formed on the flywheels 40 and 40'; 39 and 39' are the capstan axes; 50 and 50' are the reel axes; 52 and 52' are the gears provided on the reel axes 50 and 50'; and 53 and 53' are the gears, and these gears 53 and 53' are rotatably supported to arms 55 and 55'. Holes 56 and 56' in these arms 55 and 55' are rotatably supported to the pin provided on the chassis 11. Numeral 57 is a spring whose end portions are fixed to the arms 55 and 55' and the arms 55 and 55' are forced in the direction where they approach mutually due to tensile force of this spring 57. Numeral 58 denotes a switching plate slidably supported by pins 59, 60 and 61 provided on the chassis 11, and a folding hole 62 is formed in this switching plate 58. The switching plate 58 moves in the direction indicated by an arrow X when the side A of the magnetic tape is run (in the reproducing or recording mode of the side A), or it moves in the direction indicated by an arrow Y when the side B is run (in the reproducing or recording mode of the side B).

Reference numeral 63 denotes a slide plate which is supported slidably in the directions of Z and Z' by a pin 64 formed on the chassis 11. A projection 65 is provided on one end of this slide plate 63 and a long hole 66 is formed in the other end. The projection 65 of the slide plate 63 is inserted into the folding hole 62 of the switching plate 58. When the switching plate 58 moves in the X direction, the slide plate 63 moves in the Z direction. Numeral 44 is the FF lever and 45 is the REW lever and these FF lever 44 and REW lever 45 are supported slidably in the directions of Z and Z' to the chassis 11. Numeral 67 is a slide plate supported slidably in the directions of X and Y to the chassis 11. A long hole 68, long guiding holes 69, 70 and 71, and a projection 72 are formed in and on this slide plate 67. A notched portion 73 is formed in the long hole 68 and a notched portion 74 is formed in the projection 72. Pins provided on the chassis 11 are inserted into the long guiding holes 69, 70 and 71, so that the slide plate 67 is slidable in the directions of X and Y. Numeral 75 denotes a driving plate and a long guiding hole 76 is formed in this driving plate 75. A pin 80 which penetrated the long guiding hole 69 in the slide plate 67 is inserted into the long guiding hole 76 in the driving plate 75. Due to this, the driving plate 75 is slidable in the directions of Z and Z' and is rotatable around the pin 80 inserted into the long guiding hole 76. Numeral 77 denotes a bent projection formed by folding downward one end of the driving plate 75; 78 is a pin formed on the bottom surface at one end of the driving plate 75; and 79 is a pin formed on the bottom surface at the other end of the driving plate 75. The pin 78 penetrates the long hole 68 in the slide plate 67 and further passes between the arms 55 and 55' and is inserted into the long hole 66 of the slide plate 63.

The operations of fast forward (FF) and fast rewind (REW) when the side A is run (in the reproducing and recording mode of the side A) will now be described with respect to FIGS. 7 to 9.

FIG. 7 illustrates the running state of the side A. In FIG. 7, an arrow A indicates the running direction of the magnetic tape in the cassette half. In this state, the switching plate 58 has been moved in the X direction. Due to this, the slide plate 63 has been moved in the Z direction. Since the pin 78 of the driving plate 75 penetrates the long hole 68 in the slide plate 67 and is inserted into the long hole 66 in the slide plate 63, when the slide plate 63 moves in the Z direction, the driving plate 75 is also moved in the Z direction, so that the pin 79 of the driving plate 75 comes into engagement with the notched portion 74 of the projection 72 of the slide plate 67.

FIG. 8 illustrates the state in that the FF lever 44 was pressed in the Z' direction to perform the fast forwarding (FF) operation in the running state of the side A shown in FIG. 7. When the FF lever 44 is pushed in the Z' direction, the slide plate 67 is pushed by the FF lever 44 and is moved in the X direction. Thus, the pin 79 of the driving plate 75 in engagement with the notched portion 74 of the projection 72 of the slide plate 67 is also moved in association with the travelling of the slide plate 67 in the X direction. Due to this, the driving plate 75 is rotated in the direction indicated by an arrow R' around the pin 80 (pin provided on the chassis 11) which was inserted into the long guiding hole 76. When the driving plate 75 rotates in the direction of the arrow R', the arm 55 is rotated by the bent projection 77 of the driving plate 75 in the direction (S' direction) where the arm 55 approaches the capstan axis 39. Thus, the gear 53 supported to the arm 55 engages the gear 54 of a large diameter of the flywheel 40 and also engages the gear 52 of the reel axis 50. Due to this, the rotational force of the flywheel 40 is transferred from the gear 54 through the gear 53 to the gear 52, so that the reel axis 50 is rotated at a high speed, thereby fast forwarding the magnetic tape in the A direction.

FIG. 9 illustrates the state in that the REW lever 45 was pushed in the Z' direction to perform the fast rewinding (REW) operation in the running state of the side A shown in FIG. 7. When the REW lever 45 is pushed in the Z' direction, the slide plate 67 is pressed by the REW lever 45 and is moved in the direction indicated by an arrow Y. Thus, the pin 79 of the driving plate 75 in engagement with the notched portion 74 of the projection 72 of the slide plate 67 is also moved in association with the travelling of the slide plate 67 in the Y direction. As a result, the driving plate 75 is rotated in the direction indicated by the arrow R around the pin 80 (pin provided on the chassis 11) inserted into the long guide hole 76. When the driving plate 75 is rotated in the R direction, the arm 55' is rotated by the bent projection 77 of the driving plate 75 in the direction (S direction) where the arm 55' approaches the capstan axis 39'. Thus, the gear 53' supported to the arm 55' engages the gear 54' of a large diameter of the flywheel 40' and also engages the gear 52' of the reel axis 50'. Consequently, the rotational force of the flywheel 40' is transferred from the gear 54' through the gear 53' to the gear 52', so that the reel axis 50' is rotated at a high speed, thereby fast rewinding the magnetic tape in the B direction.

Then, the operations of fast forward (FF) and fast rewind (REW) when the side B is run (in the reproducing or recording mode of the side B) will be described with respect to FIGS. 10 to 12.

FIG. 10 illustrates the running state of the side B. In FIG. 10, an arrow B indicates the running direction of the magnetic tape in the cassette half. In this state, the switching plate 58 is travelling in the Y direction. Thus, the slide plate 63 is travelling in the Z' direction. Since the pin 78 of the driving plate 75 penetrates the long hole 68 in the slide plate 67 and is inserted into the long hole 66 in the slide plate 63, when the slide plate 63 moves in the Z' direction, the driving plate 75 is also moved in the Z' direction. Therefore, the pin 79 of the driving plate 75 disengages the notched portion 74 of the slide plate 67, while the pin 78 of the driving plate 75 engages the notched portion 73 of the long hole 68 in the slide plate 67.

FIG. 11 illustrates the state in that the FF lever 44 was pushed in the Z' direction to perform the fast forwarding (FF) operation in the running state of the side B shown in FIG. 10. When the FF lever 44 is pushed in the Z' direction, the slide plate 67 is pressed by the FF lever 44 and is moved in the X direction. Thus, the pin 78 of the driving plate 75 in engagement with the notched portion 73 of the slide plate 67 is also moved in association with the travelling of the slide plate 67 in the X direction. Due to this, the driving plate 75 is rotated in the direction indicated by an arrow R around the pin 80 (pin provided on the chassis 11) inserted into the long guiding hole 76. [In addition, the rotating direction (R direction) of the driving plate 75 upon the fast forwarding operation in the running state of the side B shown in FIG. 11 is opposite to the rotating direction (R' direction) of the driving plate 75 upon the fast forwarding operation in the running state of the side A shown in FIG. 8.] In this FIG. 11, when the driving plate 75 is rotated in the direction indicated by the arrow R, the arm 55' is rotated in the direction indicated by an arrow S by the bent projection 77 of the driving plate 75, so that the gear 53' supported to the arm 55' comes into engagement with the gear 54' of a large diameter on the flywheel 40' and with the gear 52' of the reel axis 50'.

Therefore, the rotational force of the flywheel 40' is transferred from the gear 54' through the gear 53' to the gear 52', so that this causes the reel axis 50' to be rotated at a high speed, thereby fast forwarding the magnetic tape in the B direction.

FIG. 12 illustrates the state in that the REW lever 45 has been pushed in the Z' direction to perform the fast rewinding (REW) operation in the running state of the side B shown in FIG. 10. When the REW lever 45 is pushed in the Z' direction, the slide plate 67 is pushed by the REW lever 45 and is moved in the direction indicated by an arrow Y. Thus, the driving plate 75 is rotated in the direction (R' direction) opposite to the direction shown in FIG. 11. As a result, the arm 55 is rotated in the S' direction and the gear 53 supported to the arm 55 comes into engagement with the gear 54 of a large diameter on the flywheel 40 and with the gear 52 of the reel axis 50. Thus, the magnetic tape is fast rewound in the direction indicated by an arrow A.

As described above, in the above embodiment, the fast forwarding operation in the direction of A or B can be carried out by pushing the FF lever 44 irrespective of the running state of the side A or B, and at the same time the fast rewinding operation in the direction of B or A can be performed by pushing the REW lever 45 irrespective of the running state of the side A or B.

Figure 13:
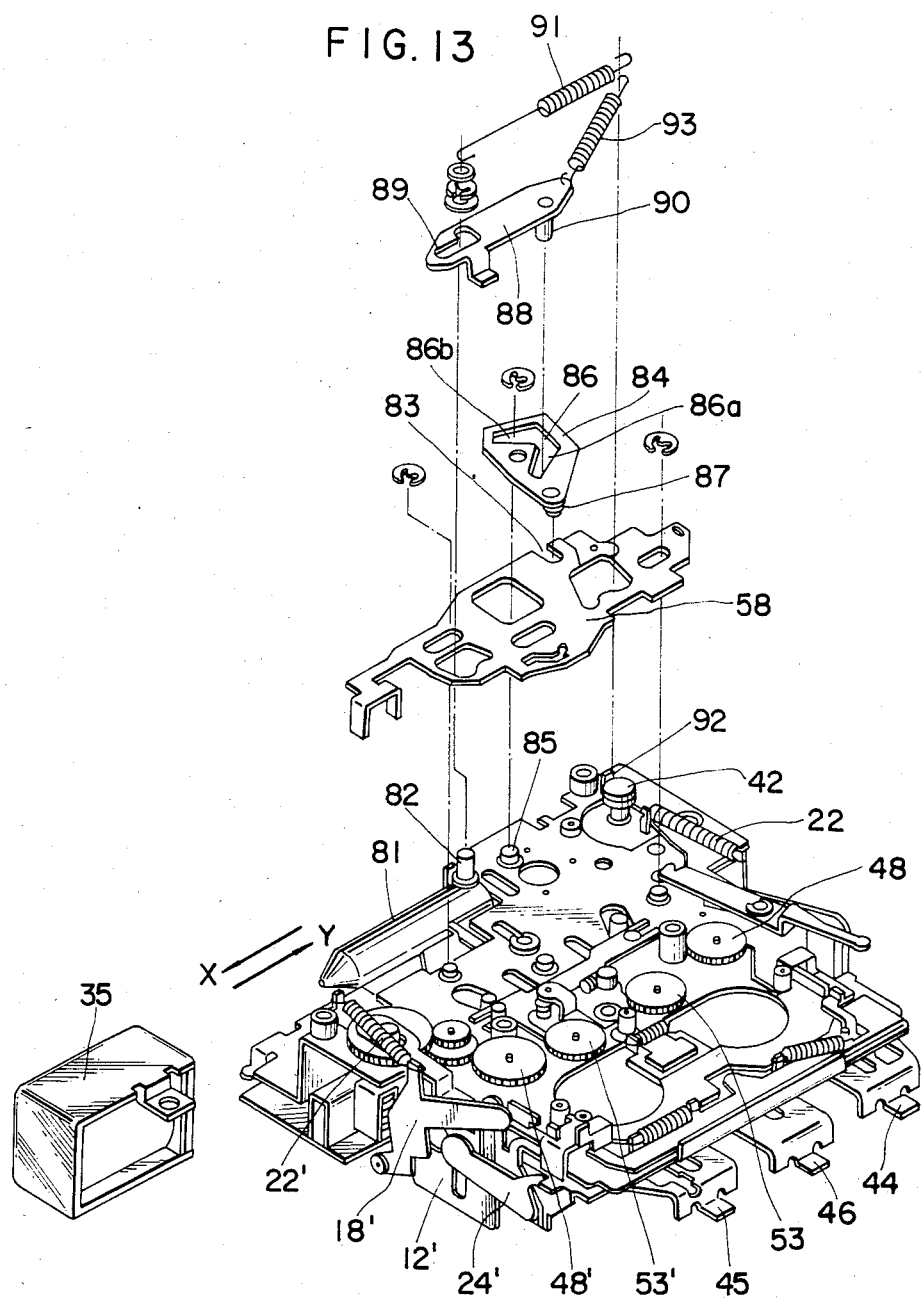
FIG. 13 is an exploded perspective view illustrating a part of the apparatus shown in FIGS. 3 and 4.

FIG. 13 illustrates an exploded diagram of the mechanism section to drive the switching plate 58 by the plunger 35. This mechanism will be described hereinbelow.

In FIG. 13, reference numeral 35 is the plunger and 81 indicates a movable member of the plunger 35. A pin 82 is implanted in the edge of this movable member 81. Numeral 58 is the switching plate and this switching plate 58 is slidably supported to the chassis 11 by a pin. Numeral 83 denotes an engaging concave portion formed in the switching plate 58.

Numeral 84 represents a rotary plate which is rotatably supported to a pin 85 provided on the chassis 11. A V-shaped groove 86 is formed in this rotary plate 84 and a pin 87 adapted to always engage the engaging concave portion 83 in the switching plate 58 is also formed on this rotary plate 84. Numeral 88 denotes a driving lever and a hole 89 is formed in this driving lever 88, while a pin 90 is implanted therein. The pin 82 of the movable member 81 of the plunger 35 is inserted into the hole 89, while the pin 90 is inserted into the V-shaped groove 86 of the rotary plate 84. Numeral 91 denotes a spring and one end thereof is fixed to a bent member 92 of the chassis 11 and the other end is fixed to the pin 82 of the movable member 81. This spring 91 exerts the force to the movable member 81 in the direction such that it is pulled out from the plunger 35. Numeral 93 is a spring and one end thereof is fixed to the bent member 92 of the chassis 11 and the other end is fixed to the driving lever 88. This spring 93 serves to return the driving member 88 in the axial direction of the movable member 81.

In FIG. 13, when the plunger 35 is energized, the movable member 81 is attracted in the X direction. When the movable member 81 is moved in the X direction, the driving lever 88 in engagement with the pin 82 of this movable member 81 is also moved in the X direction. Thus, the pin 90 of the driving lever 88 enters one groove 86a of the V-shaped groove 86 in the rotary plate 84, thereby allowing the rotary plate 84 to be rotated clockwise. When the rotary plate 84 is rotated clockwise, the switching plate 58 adapted to engage the pin 87 of this rotary plate 84 is driven in the X direction. Now, when the energization to the plunger 35 is shut off, the movable member 81 is returned in the Y direction by the spring 91, and at the same time the driving lever 88 which has been slightly rotated clockwise at the driving time of the plunger is returned by the spring 93 so as to move along the axial direction of the movable member 81. However, the switching plate 58 is kept in the state in that it has been moved in the X direction and the rotary plate 84 is kept into the state in that it has been rotated clockwise.

Next, the plunger 35 is again energized, the movable member 81 is moved in the X direction and the driving lever 88 is also moved in the X direction. When the driving lever 88 is moved in the X direction, a pin 90 of this driving lever 88 enters into the other groove 86b of the V-shaped groove 86 in the rotary plate 84, thereby rotating the rotary plate 84 counterclockwise. Thus, the switching plate 58 is slided in the Y direction.

In this way, the rotary plate 84 is alternately driven clockwise and counterclockwise whenever the plunger 35 is energized, so that this allows the switching plate 58 to be alternately driven in the X and Y directions. In addition, the energization to the plunger 35 is controlled by a manual switch for changing over the running direction or by a switch to be driven when the end of the magnetic tape is detected.

FIGS. 14 to 19 illustrate a second embodiment of the present invention.

In FIGS. 14–19, reference numeral 100 denotes a slide plate slidably supported to a chassis (not shown). Long holes 101 and 102 are formed in this slide plate 100 and pins provided on the chassis are inserted into these long holes 101 and 102. The slide plate 100 is slidable in the directions indicated by arrows X and Y. Numerals 103 and 104 represent pins fixed to the slide plate 100. Numeral 105 indicates a triangular rotary plate and a pin 107 provided on the chassis is inserted into a hole 106 in this rotary plate 105, thereby enabling the rotary plate 105 to be rotated around this pin 107. A first top portion of the triangular rotary plate 105 and the slide plate 100 are coupled by a pin. When the slide plate 100 is slided in the X direction, the rotary plate 105 is rotated counterclockwise around the pin 107. On the contrary, when the slide plate 100 is slided in the Y direction, the rotary plate 105 is rotated clockwise.

Reference numeral 108 represents an FR switching plate and one end thereof is coupled to a second top portion of the rotary plate 105 by a pin 109. Numerals 110 and 111 are notches formed at the right and left portions near the center of the FR switching plate 108, and 112 is a long hole formed at the other end of the FR switching plate 108. Numeral 113 is a switching plate and this switching plate 113 corresponds to the switching plate 58 in the first embodiment shown in FIGS. 3 to 13. This switching plate 113 is movable in the X and Y directions. A pin 114 is fixed to one end of the switching plate 113 and this pin 114 is inserted into the long hole 112 in the FR switching plate 108. Numeral 115 is a rotary plate and this rotary plate 115 corresponds to the rotary plate 84 in the first embodiment (FIGS. 7-13). A hole 116 is formed in a rotary plate 115 and a pin fixed onto the chassis is inserted into this hole 116, so that this allows the rotary plate 115 to be rotated clockwise or counterclockwise around this pin. The rotary plate 115 and switching plate 113 are coupled by a pin 117. Numeral 118 is a rotary arm and a pin 120 fixed onto the chassis is inserted into a hole 119 in this rotary arm 118, thereby enabling the rotary arm 118 to be rotated clockwise or counterclockwise around this pin 120. One end of the rotary arm 118 and switching plate 113 are coupled by a pin 121.

In FIGS. 14 to 19, numerals 50 and 50' are the reel axes and these reel axes 50 and 50' are rotatably supported to a base plate (base plate corresponding to the base plate 51 in the first embodiment shown in FIGS. 3 to 13) fixed to the chassis. Numerals 52 and 52' are the gears provided on the reel axes 50 and 50'; 39 and 39' are the capstan axes rotatably supported to bearings fixed to the chassis; 40 and 40' are the flywheels fixed to the capstan axes 39 and 39'; 49 and 49' are the gears of small diameters formed on the flywheels 39 and 39'; and 54 and 54' are the gears of large diameters formed on the flywheels 39 and 39'.

Reference numerals 122 and 122' denote arms and holes 123 and 123' are formed in these arms 122 and 122'. Pins (not shown) fixed onto the chassis are inserted into these holes 123 and 123', thereby enabling the arms 122 and 122' to be rotated around these pins. Numerals 124 and 124' indicate gears rotatably supported to the arms 122 and 122'. Numeral 125 is a driving plate and a hole 126 is formed in this driving plate 125. A pin fixed onto the chassis is inserted into this hole 126, so that the driving plate 125 is rotatable clockwise or counterclockwise. Numerals 127 and 128 denote pins fixed onto the driving plate 125 and these pins 127 and 128 are fixed on the opposite side of the hole 126. Numeral 129 is a spring and both end portions of this spring 129 are fixed to the arms 122 and 122', respectively. The arms 122 and 122' are forced due to elastic force of this pring 129 in the direction such that they approach mutually. Numerals 130 and 130' denote operating portions which are constituted by folding parts of the arms 122 and 122' substantially at a right angle.

Numeral 131 is an FF lever and this FF lever 131 is supported to the chassis so as to be slidable in the directions indicated by arrows Z and Z'. Numeral 132 is a hole formed in the FF lever 131 and a portion of the edge of this hole 132 is slant for the sliding directions (Z and Z' directions) of the FF lever 131, thereby to form a slant edge 133.

Numeral 134 is an REW lever supported to the chassis so as to be slidable in the directions indicated by the arrows Z and Z'. A part of the outside edge of the REW lever 134 is slant for the sliding directions (Z and Z' directions) of the REW lever 134, and thereby to form a slant edge 135.

The run driving system of the second embodiment shown in FIGS. 14 to 19, namely, the run driving system whereby the rotational force of the motor is transferred to the reel axis 50 or 50' and the reel in the cassette half is rotated for allowing the magnetic tape to be run and thereby performing the reproduction or recording is similar to that in the first embodiment. A different point between the second embodiment (FIGS. 14–19) and the first embodiment (FIGS. 3–13) relates to the mechanism to fast forward (FF) or fast rewind (REW) the magnetic tape.

In particular, a feature of the second embodiment is that there are provided the slide plate 100 having the pins 103 and 104, rotary plate 105, FR switching plate 108 having the notches 110 and 111, driving plate 125 having the pins 127 and 128 which can engage the notches 110 and 111, etc.

The operations of the second embodiment shown in FIGS. 14 to 19 will then be described.

Figure 14:
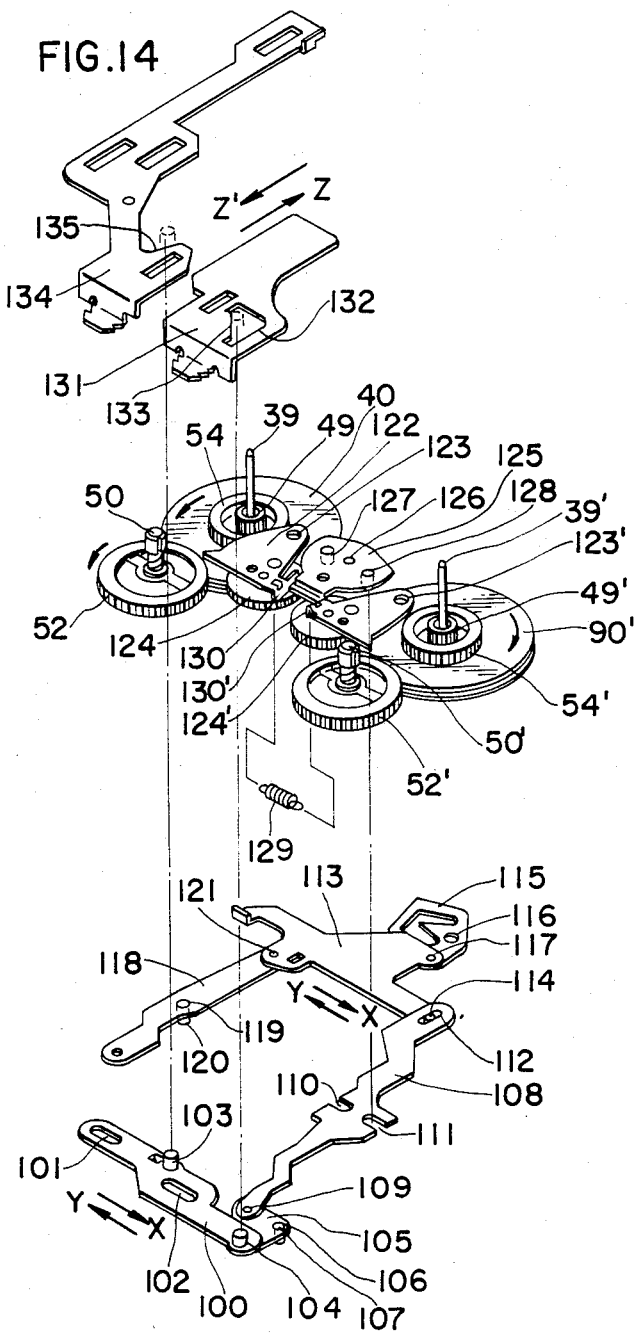
FIGS. 14 to 19 are exploded perspective views illustrating the principal sections to show the operations of another embodiment of the present invention.

FIG. 14 illustrates the state in the running of the side A (in the reproducing or recording mode of the side A). When the side A is run, similar to the first embodiment shown in FIGS. 3 to 13, the rotational force of the motor is transferred through the belt to the flywheels 40 and 40', so that the flywheel 40 is rotated counterclockwise and the flywheel 40' is rotated clockwise. In this A-side running, a gear (not shown in FIG. 14, but which corresponds to the gear 48 in the first embodiment shown in FIGS. 3–13) comes into engagement with the gear 49 of a small diameter of the flywheel 40 and with the gear 52 provided on the reel axis 50. Consequently, the reel axis 50 is rotated counterclockwise and this allows the reel adapted to engage the reel axis 50 in the reel in the cassette half to be driven and rotated. In addition, in the A-side running, since the rotary plate 115 has been rotated counterclockwise, the switching plate 113 is in the state in that it has been slided in the X direction, so that the FR switching plate 108 is in the state whereby it has been rotated clockwise around the pin 109. In the state in that the FR switching plate 108 has been rotated clockwise around the pin 109, the pin 128 of the driving plate 125 enters the notch 111 of the FR switching plate 108, so that the pin 127 of the driving plate 125 is in the state in that it can disengage the notch 110 of the FR switching plate 108.

Figure 15:
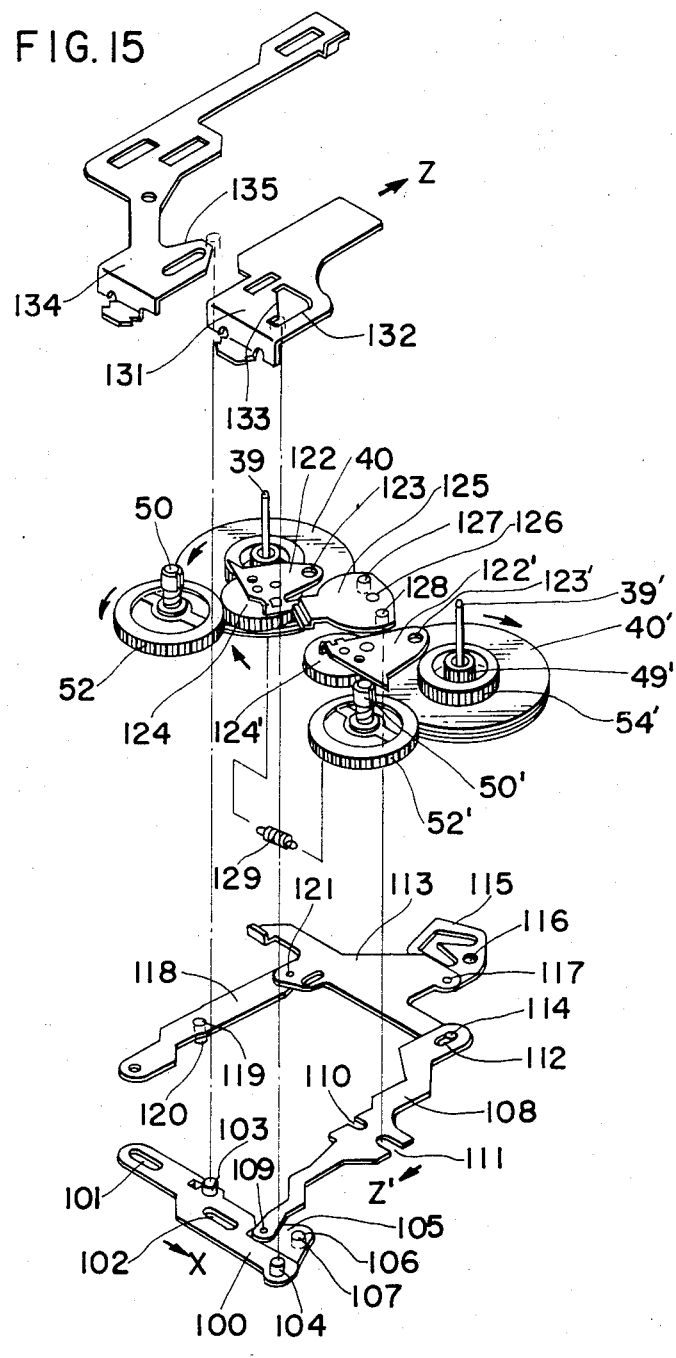

In the running state of the side A shown in FIG. 14, in case of performing the fast forward (FF), the FF lever 131 is pushed in the Z direction as shown in FIG. 15. When the FF lever 131 is moved in the Z direction, the pin 104 is pushed due to the slant edge 133 of the FF lever 131, so that the slide plate 100 is slided in the X direction. When the slide plate 100 slides in the X direction, the rotary plate 105 is rotated counterclockwise, so that the FR switching plate 108 coupled to this rotary plate 105 is moved in the Z' direction. When the FR switching plate 108 is moved in the Z' direction, the pin 128 of the driving plate 125 is driven by the FR switching plate 108. As a result, the driving plate 125 is rotated clockwise. When the driving plate 125 is rotated clockwise, the arm 122 is pushed toward the capstan axis 39 by the driving plate 125, so that the gear 124 supported to this arm 122 comes into engagement with the gear 54 of a large diameter of the flywheel 40 and with the gear 52 of the reel axis 50. (In addition, when the FF lever 131 is depressed, the gear which has been in engagement with the gear 49 of a small diameter of the flywheel 40 and with the gear 52 of the reel axis 50 to transfer the rotational force of the flywheel 40 to the gear 52 of the reel axis 50 is moved in accordance with the pressure of the FF lever 131, so that this causes the state in that the rotational force of the flywheel 40 cannot be transferred to the reel axis 50.)

As shown in FIG. 15, when the gear 124 supported to the arm 122 engages the gear 54 of a large diameter of the flywheel 40 and the gear 52 of the reel axis 50 by depressing the FF lever 131, the rotational force of the flywheel 40 is transferred through the gear 54 of a large diameter and gear 124 to the gear 52 of the reel axis 50, thereby rotating the reel 50 counterclockwise at a high speed (at a higher speed than the speed in the running state of the side A shown in FIG. 14). Namely, the fast forwarding (FF) operation of the side A is carried out.

Figure 16:
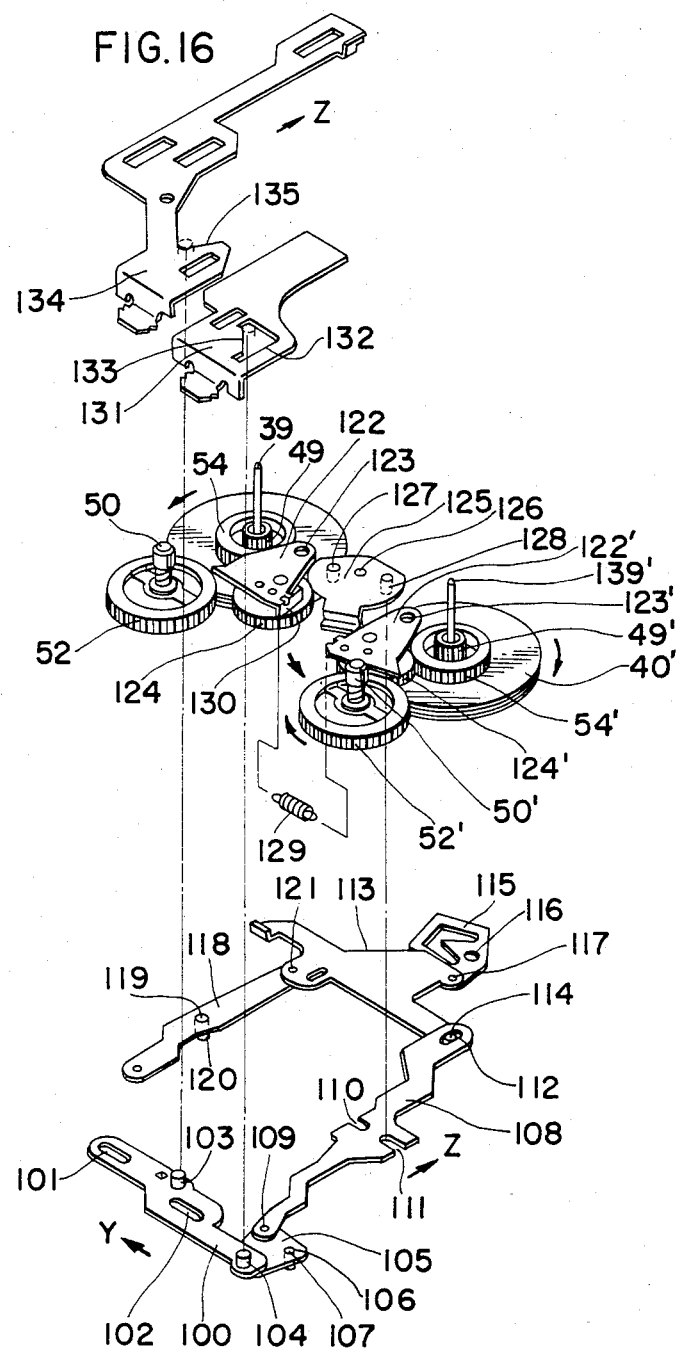

On the other hand, in the running state of the side A shown in FIG. 14, when the REW lever 134 is pushed in the direction indicated by the arrow Z, the pin 103 is driven by the slant edge 135 of the REW lever 134 as shown in FIG. 16 and the slide plate 100 is slided in the Y direction. When the slide plate 100 is moved in the Y direction, the rotary plate 105 is rotated clockwise and the FR switching plate 108 is moved in the direction of the arrow Z. When the FR switching plate 108 is moved in the direction of the arrow Z, the pin 128 in engagement with the notch 111 of the FR switching plate 108 is driven, so that the driving plate 125 is rotated counterclockwise, thereby causing the arm 122' to be rotated counterclockwise and the gear 124' supported to the arm 122' to come into engagement with the gear 54' of a large diameter of the flywheel 40' and with the gear 52' of the reel axis 50'. When the gear 124' supported to the arm 122' engages the gear 54' of a large diameter of the flywheel 40' and the gear 52' of the reel axis 50', the clockwise rotational force of the flywheel 50' is transferred to the gear 54' of a large diameter, gear 124' of the arm 122' and gear 52' of the reel axis 50', so that the reel axis 50' is rotated clockwise at a high speed. That is, the fast rewinding (REW) operation of the side A is performed.

Figure 17:
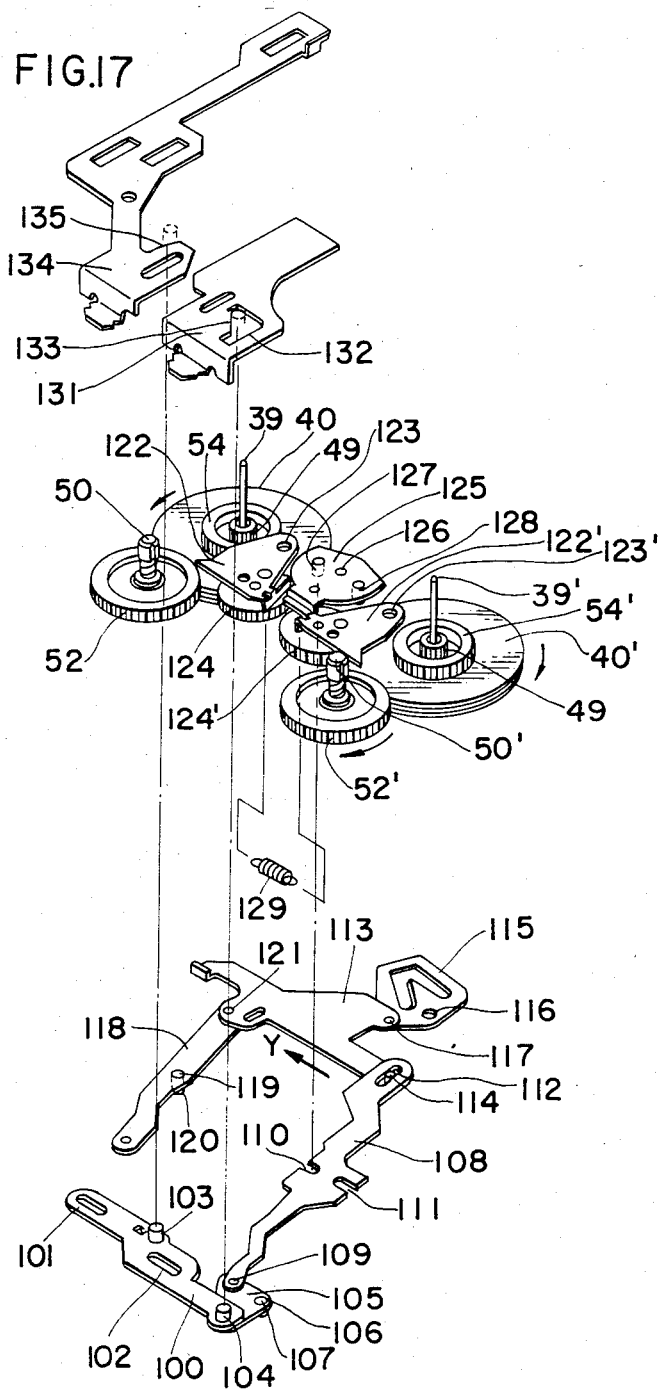

FIG. 17 illustrates the running state of the side B (in the reproducing or recording mode of the side B). In this running state of the side B, a gear (not shown in FIG. 17, but which corresponds to the gear 48' in the first embodiment shown in FIGS. 3 to 13) comes into engagement with the gear 49' of a small diameter of the flywheel 40' and with the gear 52' provided on the reel axis 50'. Thus, the clockwise rotation of the flywheel 40' is transferred through the above-mentioned gear to the reel axis 50', thereby rotating the reel axis 50' clockwise. On the other hand, in the running state of the side B shown in FIG. 17, the rotary plate 115 is in the state in that it has been rotated clockwise and the switching plate 113 coupled to this rotary plate 115 is in the state in that it has been slided in the Y direction. In this state whereby the switching plate 113 has been slided in the Y direction, the FR switching plate 108 is in the state in that it has been rotated counterclockwise around the pin 109. In the state whereby the FR switching plate 108 has been rotated counterclockwise, the pin 128 of the driving plate 125 is in the state in that it is out of the notch 111 of the FR switching plate 108 and is also in the state in that the pin 127 of the driving plate 125 is in the notch 110 of the FR switching plate 108.

Figure 18:
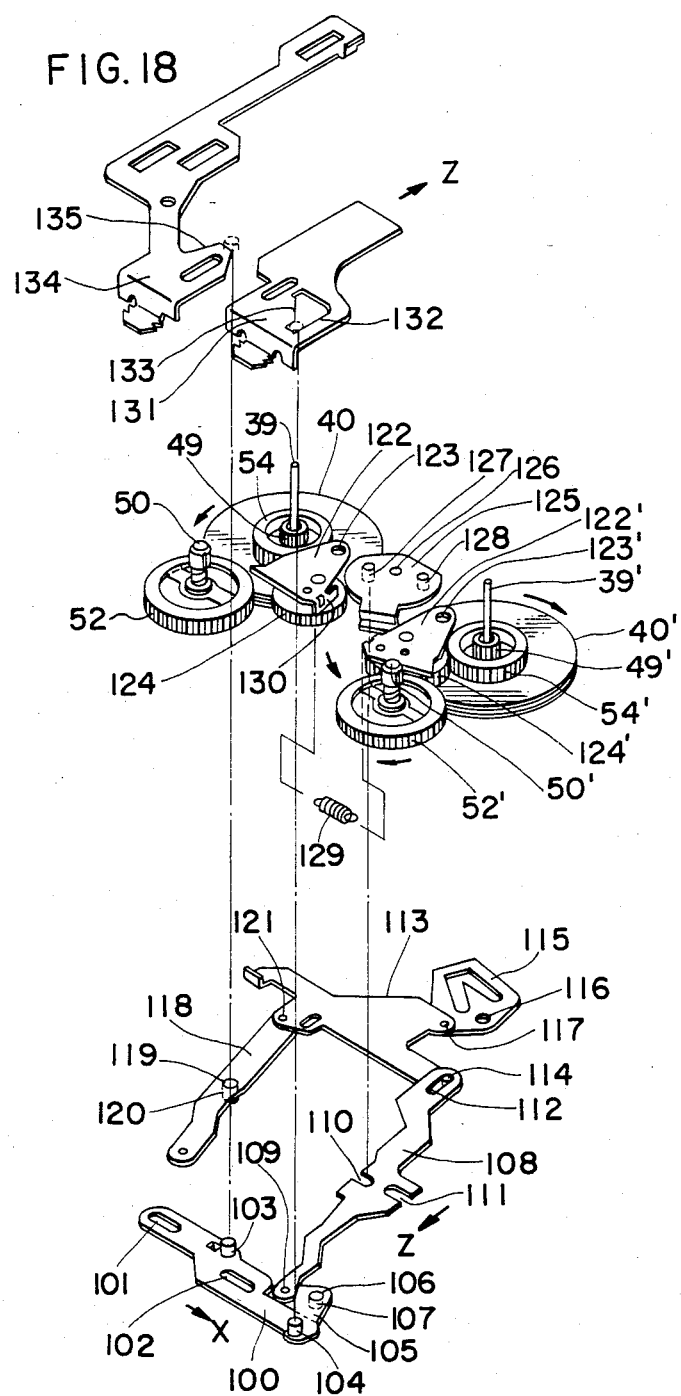

In the running state of the side B shown in FIG. 17, when the FF lever 131 is pushed in the direction indicated by an arrow of Z, the slide plate 100 is driven by the FF lever 131 in the direction indicated by an arrow X as shown in FIG. 18. When the slide plate 100 is driven in the X direction, the rotary plate 105 coupled to this slide plate 100 is rotated counterclockwise, so that the FR switching plate 108 coupled to this rotary plate 105 is moved in the direction indicated by an arrow Z'. When the FR switching plate 108 is moved in the direction of the arrow Z', the pin 127 in engagement with the notch 110 of the Fr switching plate 108 is driven, so that the driving plate 125 is rotated counterclockwise, thereby rotating the arm 122' counterclockwise. When the arm 122' is rotated counterclockwise, the gear 124' supported to the arm 122' comes into engagement with the gear 54' of a large diameter of the flywheel 40' and with the gear 52' of the reel axis 50'. Due to this, the rotation of the flywheel 40' is transferred to the gear 54' of a large diameter, gear 124' and gear 52' of the reel axis 50', thereby allowing the reel axis 50' to be rotated clockwise at a high speed. Namely, the fast forwarding (FF) operation of the side B is performed.

Figure 19:
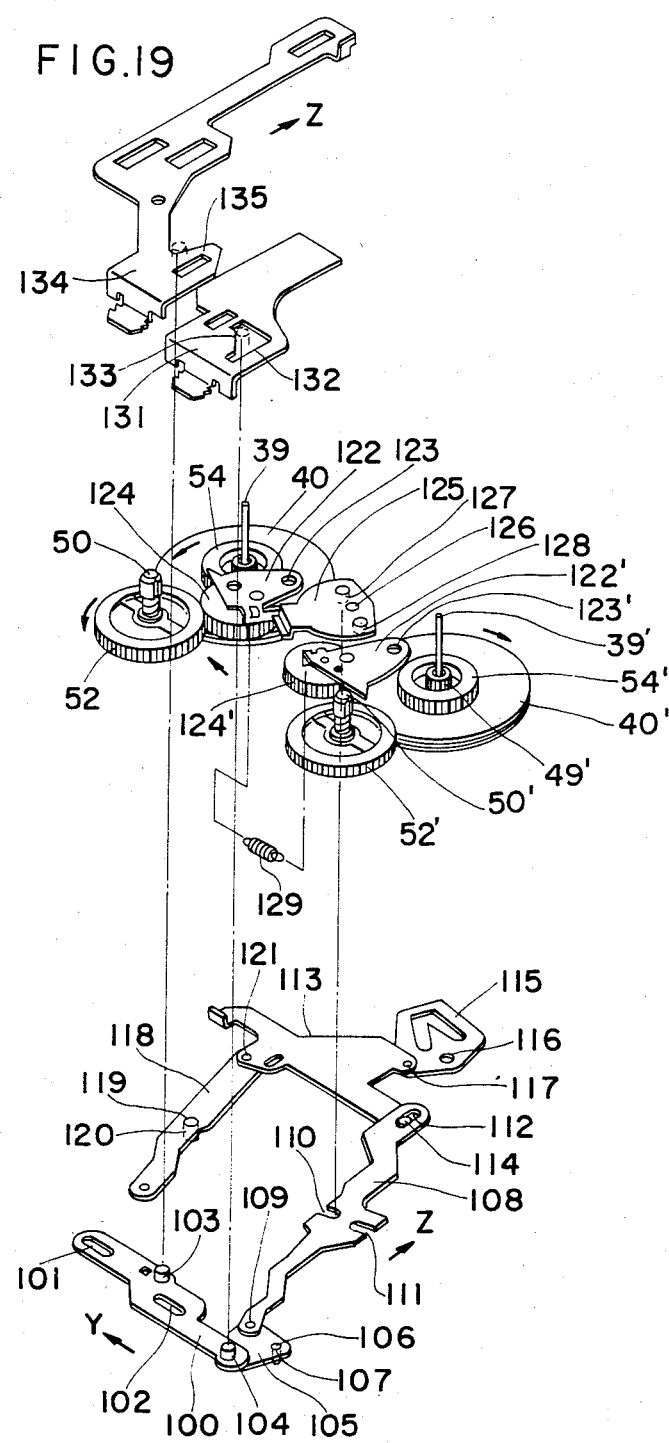

On the other hand, in the running state of the side B shown in FIG. 17, when the REW lever 134 is pushed in the Z direction, the slide plate 100 is moved in the Y direction as shown in FIG. 19, so that the rotary plate 105 is rotated clockwise and the FR switching plate 108 is moved in the direction indicated by an arrow Z. When the FR switching plate 108 is moved in the direction of the arrow Z, the pin 127 is driven by the FR switching plate 108, so that the driving plate 125 is rotated clockwise, thereby allowing the arm 122 to be rotated clockwise. When the arm 122 is rotated clockwise, the gear 124 supported by this arm 122 comes into engagement with the gear 54 of a large diameter of the flywheel 40 and with the gear 52 of the reel axis 50. Consequently, the counterclockwise rotation of the flywheel 40 is transferred to the gear 54 of a large diameter, gear 124 and gear 52 of the reel axis 50, so that the reel axis 50 is rotated counterclockwise at a high speed. That is, the fast rewinding (REW) operation of the side B is executed.

As described above, in the running state of the side A of the magnetic tape (FIG. 14) or in the running state of the side B (FIG. 17), when the FF lever 131 is pushed, the fast forwarding (FF) operation of the side A or B is performed. In addition, when the REW lever 134 is pushed in the running state of the side A or B, the fast rewinding (REW) operation of the side A or B is carried out. Namely, even in any running state of the side A and B, the fast forwarding (FF) operation is performed by pressing the lever 131, while the fast rewinding (REW) operation is executed by pushing the lever 134.

What we claim is:

1. A magnetic tape transport apparatus comprising:
a motor;
first and second reel driving means adapted to respectively engage first and second reels in a cassette half;
first rotational force transferring means for transferring a rotational force of the motor to said first or second reel driving means, thereby allowing a magnetic tape in said cassette half to be run at a first speed;
running direction switching means for controlling said first rotational force transferring means, thereby switching the running direction of said magnetic tape;
second rotational force transferring means for transferring the rotational force of said motor to said first or second reel driving means, thereby allowing said magnetic tape to be run at a second speed faster than said first speed;
exclusive fast forwarding means for engaging said second rotational force transferring means in a first state, thereby allowing said magnetic tape to be fast forwarded in a first running direction at the second speed, in a recording or reproducing mode in which said magnetic tape is run in the first running direction at the first speed for recording or reproduction, and for engaging said second rotational force transferring means in a second state, thereby allowing said magnetic tape to be fast forwarded in a second running direction at the second speed, in a recording or reproducing mode in which said magnetic tape is run in the second running direction at the first speed; and
exclusive fast rewinding means for engaging said second rotational force transferring means in a second state, thereby allowing said magnetic tape to be fast rewinded in the second running direction at the second speed, in a recording or reproducing mode in which said magnetic tape is run in the first running direction at the first speed for recording or reproduction, and for engaging said second rotational force transferring means in a first state, thereby allowing said magnetic tape to be fast rewinded in the first running direction at the second speed, in a recording or reproducing mode in which said magnetic tape is run in the second running direction at the first speed for recording or reproduction.

2. A magnetic tape transport apparatus according to claim 1, a part of said first rotational force transferring means is commonly used as a part of said second rotational force transferring means.

3. A magnetic tape transport apparatus comprising:
a motor;
transferring means for transferring the rotational force of said motor to first and second flywheels;
gears provided on said first and second flywheels, respectively;
first and second reel axes on which gears are provided;
first and second movable gears;
slidable FF lever and REW lever; and
gear moving mechanism, to be driven by said FF lever or REW lever, for moving said movable first or second gear in accordance with the running direction of a magnetic tape, thereby allowing said first or second gear to be come into engagement with the gear provided on said flywheel and with the gear provided on said reel axis,
wherein said gear moving mechanism includes first and second gears rotatably mounted to first and second rotatable arms, and a driving plate which is driven by the FF lever or REW lever and whose rotating direction differs depending upon the running direction of the magnetic tape,
and wherein said driving plate is rotated when said FF lever or REW lever is operated and said first or second arm is rotated by said driving plate, thereby allowing the first or second gear mounted to said first or second arm to be come into engagement with the gear provided on said flywheel and with the gear provided on said reel axis.

4. A magnetic tape transport apparatus comprising:
magnetic tape running means for running a magnetic tape in a cassette half in a first running direction or in a second running direction opposite to said first running direction for recording or reproduction;
exclusive fast forwarding means for fast forwarding said magnetic tape in the first running direction in a recording or reproducing mode in which said magnetic tape is run in the first running direction for recording or reproduction, and for fast forwarding said magnetic tape in the second running direction in a recording or reproducing mode in which said magnetic tape is run in the second running direction for recording or reproduction; and
exclusive fast rewinding means for fast rewinding said magnetic tape in the second running direction in a recording or reproducing mode in which said magnetic tape is run in the first running direction for recording or reproduction, and for fast rewinding said magnetic tape in the first running direction in a recording or reproducing mode in which said magnetic tape is run in the second running direction for recording or reproduction.

5. A magnetic tape transport apparatus comprising:
a motor
first and second rotational force transferring means supported rotatably;
rotating means rotatably supported for coupling said first or second rotational force transferring means to first or second reel axis upon rotation;
lever driving force transferring means for transferring the driving force of an FF lever or an REW lever to said rotating means, thereby rotating said rotating means; and
changing means for changing a fulcrum of said rotating means in accordance with the running direction of a magnetic tape,
wherein the rotational force of said motor being transferred through said first or second rotational force transferring means to said first or second reel axis, thereby fast forwarding or fast rewinding the magnetic tape.

6. A magnetic tape transport apparatus according to claim 5 wherein said means for changing the fulcrum of the rotating means in accordance with the running direction of the magnetic tape is constituted by a driving plate which is provided with an engaging member and which is rotatably and slidably supported, a switching plate which is slid in different directions depending upon the running direction switching operation of the magnetic tape, and a slide plate having a hole into which said engaging member of said driving plate is inserted, said slide plate being slid in accordance with the sliding movement of said switching plate.

7. A magnetic tape transport apparatus according to claim 6 wherein a plunger is used as the means for sliding the switching plate and further comprising means for sliding said switching plate in different directions whenever said plunger is energized.

8. A magnetic tape transport apparatus comprising:
a motor
first and second rotational force transferring means supported rotatably;
rotating means rotatably supported for coupling said first or second rotational force transferring means to a first or a second reel axis upon rotation;
lever driving force transferring means for transferring the driving force of an FF lever or an REW lever to said rotating means, thereby rotating said rotating means; and
changing means for changing a point of application to said rotating means due to said lever driving force transferring means in accordance with the running direction of a magnetic tape,
wherein the rotational force of a motor is transferred through said first or second rotational force transferring means to said first or second reel axis, thereby fast forwarding or fast rewinding the magnetic tape.

9. A magnetic tape transport apparatus according to claim 8 wherein said changing means for changing a point of application to the rotating means due to said lever driving force transferring means in accordance with the running direction of the magnetic tape is constituted by: a rotary plate to be rotated by the operation of the FF lever or REW lever; a switching plate to be slid in different directions depending upon the running direction switching operation of the magnetic tape; a switching member in which first and second notches are formed, one end of said member being coupled to said rotary plate and the other end being coupled to said switching plate; and a rotatable operating plate provided with first and second pins which can engate said first and second notches.

10. A magnetic tape transport apparatus according to claim 9 wherein a plunger is used as the means for sliding the switching plate and there if further provided with means for sliding said switching plate in different directions whenever said plunger is energized.

11. A magnetic tape transport apparatus comprising:
a first slide plate which is driven by an FF lever or an REW lever and is slided in different directions;
a driving plate which is rotatably and slidably supported and is provided with first and second engaging members which can engage first and second notched portions of said first slide plate;
a switching plate which is slided in different directions depending upon the running direction switching operation of a magnetic tape;
a second slide plate having a hole into which one of said engaging members of said driving plate is inserted, said second slide plate being slided according to the sliding movement of said switching plate, thereby sliding said switching plate and allowing said first or second engaging member to be come into engagement with said first or second notched portion;
first and second rotatable arms;
first and second gears rotatably supported to said first and second arms;
a first reel axis with which said first gear can come into engagement; and
a second reel axis with which said second gear can come into engagement,
wherein said driving plate being rotated according to the sliding operation of said first slide plate when said FF lever or REW lever is operated, thereby allowing said first or second arm to be rotated by said driving plate.

12. A magnetic tape transport apparatus according to claim 11 wherein a plunger is used as the means for sliding the switching plate and there is further provided means for sliding said switching plate in different directions whenever said plunger is energized.

13. A magnetic tape transport apparatus comprising:
a slide plate which is driven by an FF lever or an REW lever and is slided in different directions;
a rotary plate which is coupled to said slide plate and is rotated;
a switching plate which is slided in different directions depending upon the running direction switching operation of a magnetic tape;
a switching member in which first and second notches are formed, one end of said switching member being coupled to said rotary plate and the other end being coupled to said switching plate;
a rotatable operating plate provided with first and second pins which can engage said first and second notches;
first and second rotatable arms;
first and second gears rotatably supported to said first and second arms;
a first reel axis with which said first gear can come into engagement; and
a second reel axis with which said second gear can come into engagement,
wherein said operating plate being rotated by driving said first or second pin of said operating plate in accordance with the movement of said switching member when said FF lever or REW lever is operated, thereby allowing said first or second arm to be rotated by said operating plate.

14. A magnetic tape transport apparatus according to claim 13 wherein a plunger is used as the means for sliding the switching plate and there is further provided with means for sliding said switching plate in different directions whenever said plunger is energized.

15. A magnetic tape transport apparatus comprising:
magnetic tape running direction switching means for switching a running direction of a magnetic tape to a first running direction or a second running direction in a recording or reproducing mode;
a rotatable driving plate having first and second points of application at which driving forces can be applied when said FF lever or REW lever is operated;
application point changing means for enabling a driving force upon operation of said FF lever or REW lever to be applied on said driving plate at said first point of application in according or reproducing mode in which said magnetic tape is run in the first running direction by means of said magnetic tape running direction switching means, and for enabling a driving force upon operation of said FF lever or REW lever to be applied on said driving plate at said second point of application in a recording or reproducing mode in which said magnetic tape is run in the second running direction; and
fast forwarding or fast rewinding direction switching means for fast forwarding or fast rewinding said magnetic tape in said first running direction when the driving force upon operation of said FF lever is applied at said first point of application or the driving force upon operation of said REW lever is applied at said second point of application to cause said driving plate to be rotated in a first direction of rotation, and for fast rewinding or fast forwarding said magnetic tape in said second running direction when the driving force upon operation of said FF lever is applied at said second point of application or the driving force upon operation of REW lever is applied at said first point of application.

* * * * *